US008392403B2

(12) United States Patent
Yu et al.

(10) Patent No.: US 8,392,403 B2
(45) Date of Patent: Mar. 5, 2013

(54) MANAGEMENT OF DATA AND COMPUTATION IN DATA CENTERS

(75) Inventors: Yuan Yu, Cupertino, CA (US); Pradeep Kumar Gunda, Mountian View, CA (US); Li Zhuang, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 12/562,156

(22) Filed: Sep. 18, 2009

(65) Prior Publication Data
US 2011/0072006 A1    Mar. 24, 2011

(51) Int. Cl.
G06F 7/00        (2006.01)
G06F 17/30       (2006.01)
(52) U.S. Cl. .................. 707/718; 707/719; 707/759
(58) Field of Classification Search .......... 707/713, 707/718, 719, 759
See application file for complete search history.

(56) References Cited

U.S. PATENT DOCUMENTS

| 5,161,216 | A | 11/1992 | Reps et al. |
| 6,457,020 | B1* | 9/2002 | Carey et al. .................. 707/714 |
| 7,158,985 | B1 | 1/2007 | Liskov |
| 7,499,910 | B2* | 3/2009 | Schneider et al. .................... 1/1 |
| 7,840,547 | B1* | 11/2010 | Tucker et al. ................. 707/706 |
| 2002/0007413 | A1* | 1/2002 | Garcia-Luna-Aceves et al. ............................ 709/229 |
| 2002/0032691 | A1 | 3/2002 | Rabii et al. |
| 2003/0135485 | A1* | 7/2003 | Leslie ............................... 707/3 |
| 2004/0193620 | A1* | 9/2004 | Cheng et al. .................. 707/100 |
| 2004/0260675 | A1* | 12/2004 | Bruno et al. ....................... 707/2 |
| 2007/0083483 | A1* | 4/2007 | Lawande .......................... 707/1 |
| 2007/0208690 | A1* | 9/2007 | Schneider et al. ................. 707/2 |
| 2008/0098208 | A1 | 4/2008 | Reid et al. |
| 2009/0036102 | A1* | 2/2009 | Ho .............................. 455/412.2 |
| 2009/0055349 | A1* | 2/2009 | Ahmed ............................ 707/2 |
| 2010/0191720 | A1* | 7/2010 | Al-Omari et al. ............. 707/718 |
| 2010/0257151 | A1* | 10/2010 | Lohman et al. ............... 707/715 |

OTHER PUBLICATIONS

WhatIs.com, client/server, retrieve from web archive, Jan. 7, 2011, 7 pages.*
Heydon, et al., "The Vesta Software Configuration Management System", Retrieved at <<ftp://gatekeeper.research.compaq.com/pub/DEC/SRC/research-reports/SRC-177.pdf>>, Jan. 22, 2002, pp. 233.
Pugh, et al. , "Incremental Computation via Function Caching", Retrieved at <<http://portal.acm.org/ft_gateway.cfm?id=75305&type=pdf&coll=GUIDE&dl=GUIDE&CFID=44033198&CFTOKEN=76973226>>, ACM, 1989, pp. 315-328.
Agrawal, et al. , "Dynamic Program Slicing", Retrieved at <<http://www1.cs.columbia.edu/~junfeng/08fa-e6998/sched/readings/slicing.pdf>>, pp. 1-11, Date: Jun. 1990.

(Continued)

*Primary Examiner* — Phong Nguyen
(74) *Attorney, Agent, or Firm* — Microsoft Corporation

(57) ABSTRACT

Data and computation may be unified (i.e., integrated) in a data center using a single query interface. Users may interact with the data center via a query interface to provide a query (i.e., a computation) to the data center. The results of the query may be referred to as derived datasets and may be managed by a cache server. In an implementation, a derived dataset is uniquely referenced by the query that computes it. Shared common computations are computed only once and may be reused by other computations. The result of a query may be computed (if not previously cached) and returned to the user. Infrequently used derived datasets may be garbage collected (e.g., deleted or otherwise removed from storage) by a garbage collector. This integration of data and computation provides efficient resource management for data center.

18 Claims, 7 Drawing Sheets

OTHER PUBLICATIONS

Baekgaard, et al., "Incremental Computation of Time-Varying Query Expressions", Retrieved at <<http://ieeexplore.ieee.org/stamp/stamp.jsp?arnumber=00404031>>, IEEE Transactions on Knowledge and Data Engineering, vol. 7, No. 4, Aug. 1995, pp. 583-590.

Heydon, Allan et al., "Caching function calls using precise dependencies," Proceedings of the ACM SIGPLAN '00 Conference on Programming Language Design and Implementation (PLDI), Jun. 2000, 10 pages.

Willmor, D. et al., "Program Slicing in the Presence of Database State," Proceedings of the 20th IEEE International Conference on Software Maintenance, Sep. 11-14, 2004, 5 pages.

* cited by examiner

MANAGEMENT OF DATA AND COMPUTATION IN DATA CENTERS

BACKGROUND

Managing data and computation is at the heart of data center computing. Mismanagement of data and/or computation often leads to data loss, wasted storage as unneeded or redundant data takes up storage space, and laborious bookkeeping. A lack of proper management can result in lost opportunities to reuse common computations or to calculate results incrementally.

Recent advances in distributed execution engines and high level language support have simplified the development of distributed data parallel applications. However, separation of data and computation has limited data center functionalities and data center computing.

SUMMARY

Data and computation may be unified (i.e., integrated) in a data center using a single query interface. Users may interact with the data center via a query interface to provide a query (i.e., a computation) to the data center. The results of the query may be referred to as derived datasets and may be managed by a cache server. In an implementation, a derived dataset is uniquely referenced by the query that computes it. Shared common computations are computed only once and may be reused by other computations. The result of a query may be computed (if not previously cached) and returned to the user. Infrequently used derived datasets may be garbage collected (e.g., deleted or otherwise removed from storage) by a garbage collector. Derived datasets that are garbage collected can be reconstructed from their corresponding queries. This integration of data and computation provides automatic and efficient management of data center resource utilization.

In an implementation, a query may be received by a client side library and may be fingerprinted by a fingerprinter. The fingerprint captures the program dependency of the query, and may be used as a unique identifier of the query. The fingerprint of the query may be provided to a cache server for use as a cache key to retrieve information about this query stored in a cache. The cache server returns the cached result to a query rewriter of the client side library if a result corresponding to the fingerprint is found. Otherwise, if a result is not found in the cache (e.g., a cache miss occurs), data regarding the cache miss may be provided to the query rewriter.

In an implementation, the query rewriter may rewrite the query defined by the user to an equivalent query, replacing any cached subquery with its result in the cache. Actions of creating new cache entries may be encoded in the execution plan of the query, and new entries may be inserted into the cache during the query execution. The query rewriter uses the results from the cache server to rewrite the query and chooses an optimal one from one or more candidate query plans.

In an implementation, the candidate query plans use cached results to satisfy the query and generate results of selected subqueries for additional caching. The candidate query plans may include a set of operators that may combine results (from the cache and from new execution of the query) and insert cache entries into the cache during the execution of the query. A cost estimator may estimate the cost for each candidate query plan and send one (e.g., least expensive, fastest, etc.) to a distributed execution engine for execution.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
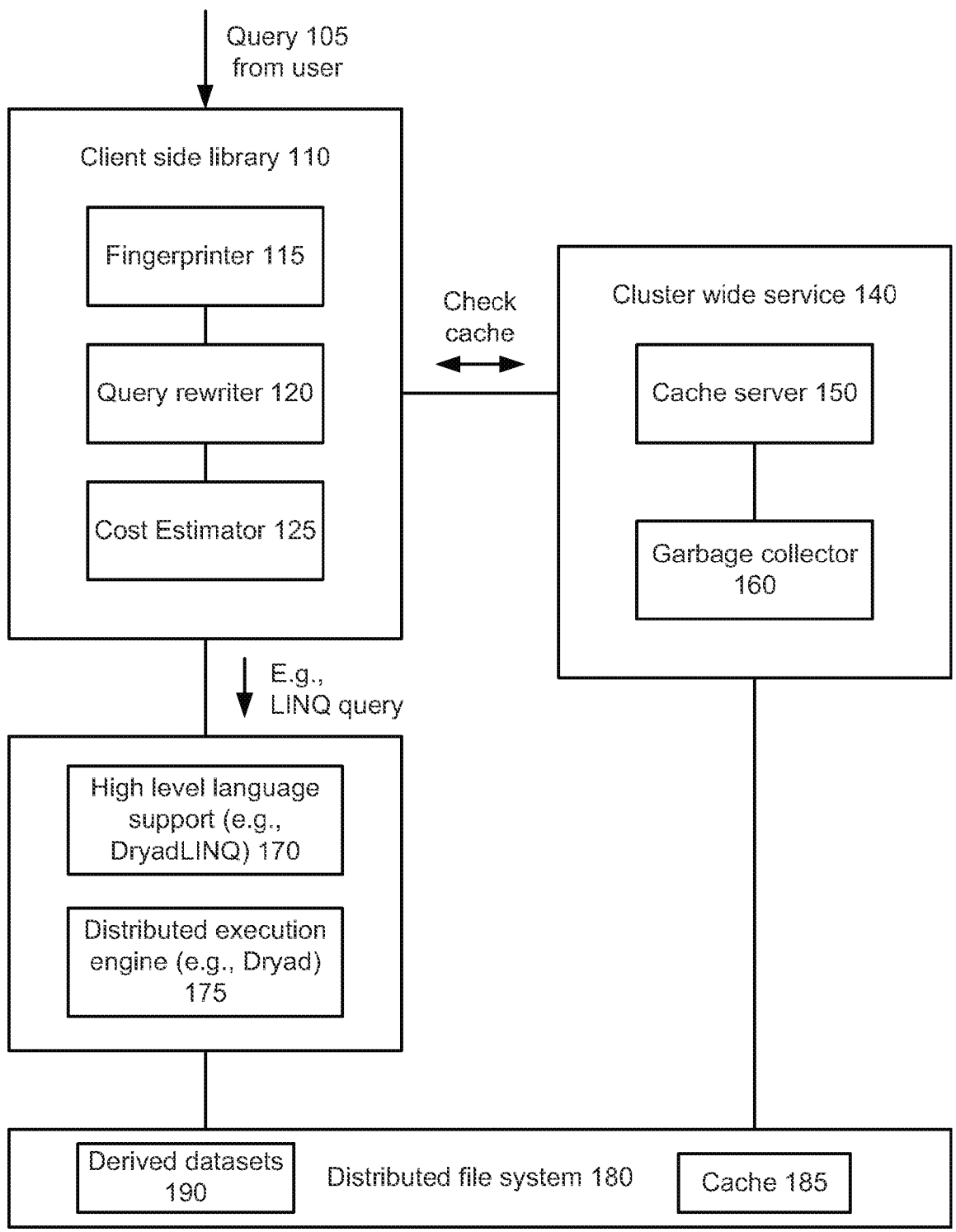
FIG. 1 illustrates an exemplary data center environment.

FIG. 1 illustrates an exemplary data center environment 100 that comprises a client side library 110, a cluster wide service 140, a distributed execution engine 175 (e.g., MapReduce, Dryad, Hadoop, etc.) with high level language support 170 (e.g., Sawzall, Pig Latin, SCOPE, DryadLINQ, etc.), and a distributed file system 180 storing the derived datasets 190 and possibly a cache 185. In an implementation, the cache may not be stored in the distributed file system 180. For example, the cache 185 may be stored in SQL databases. Any storage system such as databases may be used to store the cache 185. In an implementation, the distributed execution engine 175 may comprise Dryad and the high level language support 170 may comprise DryadLINQ. DryadLINQ is a runtime and parallel compiler that translates a LINQ (.NET Language-Integrated Query) program into a Dryad job. Dryad is a distributed execution engine that manages the execution and handles issues such as scheduling, distribution, and fault tolerance. Although examples herein may refer to Dryad and DryadLINQ, any distributed execution engine with high level language support may be used.

As described further herein, the client side library 110 may act as a query rewriting tool that replaces previously computed queries and/or subqueries with cached results. In an implementation, the client side library 110 comprises a fingerprinter 115, a query rewriter 120, and a cost estimator 125. The cluster wide service 140 may be implemented at the server side and may comprise a cache server 150 and a garbage collector 160. The client side library 110 and the cluster wide service 140 may each be implemented in one or more computing devices. An example computing device and its components are described in more detail with respect to FIG. 7.

Data and computation may be unified (also referred to as integrated) in the data center using a single query interface. Users, such as programmers or developers, may interact with the data center via a query interface, for example to provide a query 105 (also referred to as a "computation") to the data center. The results of the query 105 may be referred to as derived datasets 190 and may be managed by the cache server 150. In an implementation, a derived dataset is uniquely referenced by (i.e., identified with) the query that generates it. Shared common computations are computed only once and may be reused by other computations. The result of a query 105 may be computed (if not already cached) and returned to the user. Infrequently used derived datasets may be garbage collected (e.g., deleted or otherwise removed from storage) by the garbage collector 160. This integration of data and computation provides automatic and efficient management of data center resource utilization.

The cache server 150 caches the results of previously computed queries. In an implementation, the dependency of a query may be determined using static program analysis (e.g., program slicing). The cache server 150 maps queries to their results (i.e., their derived datasets 190). Thus, the cache server 150 knows the queries in the cluster and their relationships to the derived datasets 190. When a query 105 arrives at the client side library 110, it is looked up in the cache 185 via the cache server 150 to determine if a cache entry exists for that query. If there is a match, the cached result is returned. Otherwise, the client side library 110 attempts to identify any subquery (of the query) that has a cache entry (i.e., a subquery hit) in the cache 185, rewrites the query, and generates a query result by combining results from both the cache and the new execution of the query. New cache entries may be created if the execution of the query succeeds.

The cluster wide service 140, in conjunction with the client side library 110, provides common subqueries and incremental computation. There may be many applications (e.g., hundreds of applications) using a few large datasets. These applications may share many common subqueries. Thus, many applications running on the same data center share common subqueries. The common subqueries may be computed only once and may be reused in many applications. More particularly, because the system caches subqueries, they may be computed only once and reused by other applications. This reduces redundant computations, resulting in better resource utilization.

Regarding incremental computation, datasets, such as logs, are incrementally appended. Many queries are computed over such datasets on a regular basis. With incremental computation, each subsequent run of the same query is incremental too, proportional to the increments. This makes it easier to satisfy real time constraints of some applications. In an implementation, many data center applications repeat the same computation on a sliding window of partitions of an incrementally augmenting dataset. Caching enables the reuse of the results of old partitions and enables only computing incrementally for the newly arriving partitions.

The cluster wide service 140 may implement a cache replacement policy to delete those cache entries that are deemed least useful. For example, the cache server 150 may delete the low-value cache entries and/or the derived datasets associated with them, while retaining the high-value entries. If any deleted dataset is needed in the future, the cache server 150 may reproduce it, as described further herein.

In an implementation, the cache server 150 manages the derived datasets 190 and implements a cache eviction policy to remove any unused or infrequently used derived datasets 190. This improves the space utilization. Since a derived dataset can only be accessed using the query that computed it, there is no data loss as the system may regenerate the dataset using the query, if needed. With derived datasets automatically managed by the system, there is little need for users to manage their data manually. Since users may access their data using the query that computes it, there is no need for them to remember how the data was generated because the dataset computed by the query is returned.

The high level language support 170 for the distributed execution engine 175 may define a set of general purpose standard query operators that allow traversal, filter, and projection operations, for example, to be expressed in a declarative and imperative way. In an implementation, a user may augment the set of standard query operators with domain-specific operators that are appropriate for the target domain or technology. It is contemplated that the user may replace the standard query provider with his own implementations that provide a customized way of query execution.

In an implementation, the distributed file system 180 supports typical file operations such as adding and deleting a stream, where a stream comprises an ordered sequence of extents. The input and output of a query comprise streams. Streams are append-only, meaning that new contents can only be added by either appending to the last extent or appending a new extent. A stream may be denoted by $<e_1, e_2, \ldots, e_n>$, where $e_i$ is an extent. The distributed file system 180 may provide fingerprints for extents and streams. The fingerprint of an extent e may be denoted by FP(e) and the fingerprint of a stream s may be denoted by FP(s).

A cache key is generated for each query that maps to the result in the cache 185. In an implementation, the fingerprinter 115 may generate a Rabin fingerprint based on the query (e.g., a Rabin fingerprint of the program and the input datasets of the query) using known techniques. However, any fingerprint or signature generation technique may be used. The fingerprint may be used as the cache key. In an implementation, the input datasets may be stored in the distributed file system 180 and the program of a query is a combination of standard operators (e.g., standard LINQ operators) and user defined functions. To fingerprint the query, known reflection and static dependency analysis may be used to compute the transitive closure of the code that can be reached from the query program.

As described further herein, a query 105 may be received (e.g., from a user, via a computing device of the user, etc.) by the client side library 110 and may be fingerprinted by the fingerprinter 115. The fingerprint of the query 105 may be provided to the cache server 150 which may use the fingerprint as a cache key into a cache 185 maintained by the distributed file system 180. The cache server 150 returns the cached result to the query rewriter 120 of the client side library 110 if a result in a cache entry corresponding to the fingerprint is found. Otherwise, if a result is not found in the cache 185 (e.g., a cache miss occurs), data regarding the cache miss may be provided to the query rewriter 120.

The query rewriter 120 may rewrite the query 105 defined by the user to an equivalent query, replacing any cached query and/or subquery with its result in the cache 185. Actions of creating new cache entries may be encoded in the query, and new entries may be inserted into the cache 185 during the query execution. The query rewriter 120 may use the data to determine whether to create a cache entry for the query 105 when its execution succeeds. The query rewriter 120 uses the results from the cache server 150 to rewrite the query 105 and outputs one or more candidate query plans.

The candidate query plans use cached results to satisfy the query and generate results of queries and/or selected subqueries for additional caching. The candidate query plans may include a set of operators (e.g., of the high level language support 170) that may combine results (from the cache 185 and from new execution of the query) and insert cache entries into the cache 185 when the query succeeds. The cost estimator 125 may estimate a cost for each candidate query plan and send the best one (e.g., least expensive, fastest, etc.) to the distributed execution engine 175 with the high level language support 170 for execution.

In an implementation, the query rewriter 120 (e.g., for LINQ queries) interacts with the cache server 150 to generate a query plan that achieves query result reuse and incrementality. Query rewriting may use the information stored in the cache server 150 to determine what data to cache. Cached results for reruns of a previous query with the same input datasets are retrieved from the cache 185 and returned as the result of the query. Moreover, the re-use of cached results may be extended for subquery and partial dataset matches. Categories of partial caching include common subqueries, incremental query plans, and incremental query plans for sliding windows.

Regarding common subqueries, a query (such as a LINQ query) may be composed of subqueries. Caching all the subqueries is impractical. Thus, the system may cache only "prefix" subqueries. In an implementation, a query is built as an expression tree. A prefix subquery of a query q is a tree rooted at the first operations (i.e., input datasets) of a query. Put another way, a prefix subquery of a query q is a tree whose roots are a subset of the input datasets of q. For example, in FIG. 2 which shows an example of rewriting a query plan using cached results, the subqueries starting from dataset D+D' are prefix subqueries. Such examples include: (D+D'). Select, (D+D').Select.Where, (D+D').Select.Where. GroupBy, etc. Each operator has user defined functions that describe the actual operation in the operator; for example, a user defines a selector in Select. Two queries share a common subquery only when they each have a prefix with the same fingerprint; that is, when both operator signatures and user defined functions are identical. Given a query, its prefix subqueries whose results are cached may be found, and the query plan may be rewritten by replacing the prefix subqueries with the cached results. A list of new candidate query plans may then be generated.

Regarding incremental query plans, incremental computation in a data center often occurs when updating input datasets by appending new extents to the tail, especially for applications on distributed file systems. For example, for a computed query q on an input d, to compute q on an input d+d', the query rewriter 120 may use a combining operator C such that q(d+d')=C(q(d),q(d')). C may be derived for most operators in LINQ and extensions provided by DryadLINQ. For example, algebraic rules for some LINQ operators may be: Where(d+d')=Where(d)+Where(d'), Select(d+d')=Select(d)+Select(d'), and OrderBy(d+d')=MergeSort(OrderBy(d), OrderBy(d')), etc.

Regarding incremental query plans for sliding windows, this is a case where data is appended to the end of the input while the head of input is unused. For example, $D_1=d_1+d_2+\ldots+d_n$; $D_2=d_2+d_3+\ldots+d_{n+1}$; etc. Cache entries may be generated for each individual dataset $d_i$, and they may be combined with the execution result of $d_{n+1}$.

A query may belong to more than one category above. For example, an application that analyzes logs of a past number of days may be rewritten as an incremental query plan, and the application may also use subquery results of log preprocessing on each day from other applications.

In an implementation, a query might hit different entries in the cache server 150 with different subqueries and partial input datasets. Thus, the query rewriter 120 may generate multiple candidate query plans. Computation resources may be saved by reusing cached results. In terms of selecting the best query plan for execution, the one that uses the least cumulative machine time may be identified and selected, in an implementation. The cumulative machine time is the total occupation time on all machines that a query executes on. Thus, in an implementation, a cost metric used for comparing query plans is the cumulative machine time. The cost estimator 125 may estimate the cost of a query plan using past execution statistics (e.g., collected and saved by DryadLINQ) in an implementation.

Actual contents in the data center are stored in the distributed file system 180. The cluster wide service 140 acts as a directory that maintains links to the actual data and information. The cache server 150 maintains a mapping from queries, represented by fingerprints generated at the client side library 110, to their cache entries in the cache 185. In an implementation, a cache entry for a query is a structure that contains the location of the query result (i.e., the derived dataset), its past execution statistics, and a process or technique to reproduce the query result if the result is deleted. The information regarding a query and its execution statistics may be generated by the distributed execution engine 175. In an implementation, the cache server 150 provides an API that allows applications to insert and inquire cache entries. The cache server 150 records the number of inquiries for each query, which may be used to measure its popularity to determine if the query is worth caching (e.g., using its value relative to other queries). The execution statistics of a cache entry may comprise a list of properties, including where its program is located, the frequency it is shared, disk space used, etc. These property parameters may be used to determine a value of each cache entry.

The cluster wide cache server 150 is shared by the applications and operates transparently to the users of the associated cluster. In an implementation, the cache server 150 is persistent such that properly shutting down and restarting the cache server 150 does not lose any cache entries. The cache server 150 is fault tolerant such that it is able to recover to a consistent state in the event of crash or other failures. The cache server 150 is scalable and may able to support tens of millions of cache entries. Additionally, the cache server 150 may support concurrent garbage collection.

In an implementation, the garbage collector 160, running as a cluster service, operates transparently to the users of the cluster and deletes from the distributed file system 180 any derived dataset that is not reachable from the cache 185. The garbage collector 160 may comprise a standard mark-and-sweep collector and may identify derived datasets unreachable from any cache entry and delete them. In an implementation, content deletion is done in the background without interfering with the concurrent activities of the cache server 150 and job executions. In an implementation, the garbage collection policy is configurable such that its aggressiveness may be adjustable based on free space in the cache 185, for example.

At the server side, the distributed cluster wide service 140 is used for maintaining information regarding queries and the location of their results. The cluster wide service 140 has knowledge about the queries running in the cluster, because the client side query rewriter 120 probes it for the queries. In an implementation, when a query is run, its program is uploaded to a dedicated location in the cluster. When the cluster wide service 140 creates an entry, it also stores the program of the query along with the execution result (e.g., the derived dataset). In this way, the cache server 150 has the complete information about cached queries, meaning that it has the process to reproduce any derived dataset in the data center. By using this information, the cache server 150 can make decisions to implement a cache replacement policy, keeping the cached results of the most heavily used subqueries and deleting the cached results of the least value, such as for example, when disk space is low. Even when derived data is deleted but is requested in the future, it may be reproduced because the cache server 150 keeps the program to do this. Thus, derived datasets 190 are protected by the cache entries of the queries that produced them. Therefore, when a derived dataset becomes unreachable from the cache 185, it can be deleted by the distributed garbage collector 160.

As noted above, the result of a query, such as a DryadLINQ query, is uniquely determined by its program and input datasets. The program and input datasets of the query q may be denoted by p(q) and d(q), respectively. For a query q, the cache key is <FP(p(q)), FP(d(q))>. FP(d(q)) may be determined using information from the distributed file system 180. In an implementation, static dependency analysis may be used to determine FP(p(q)).

Figure 2:
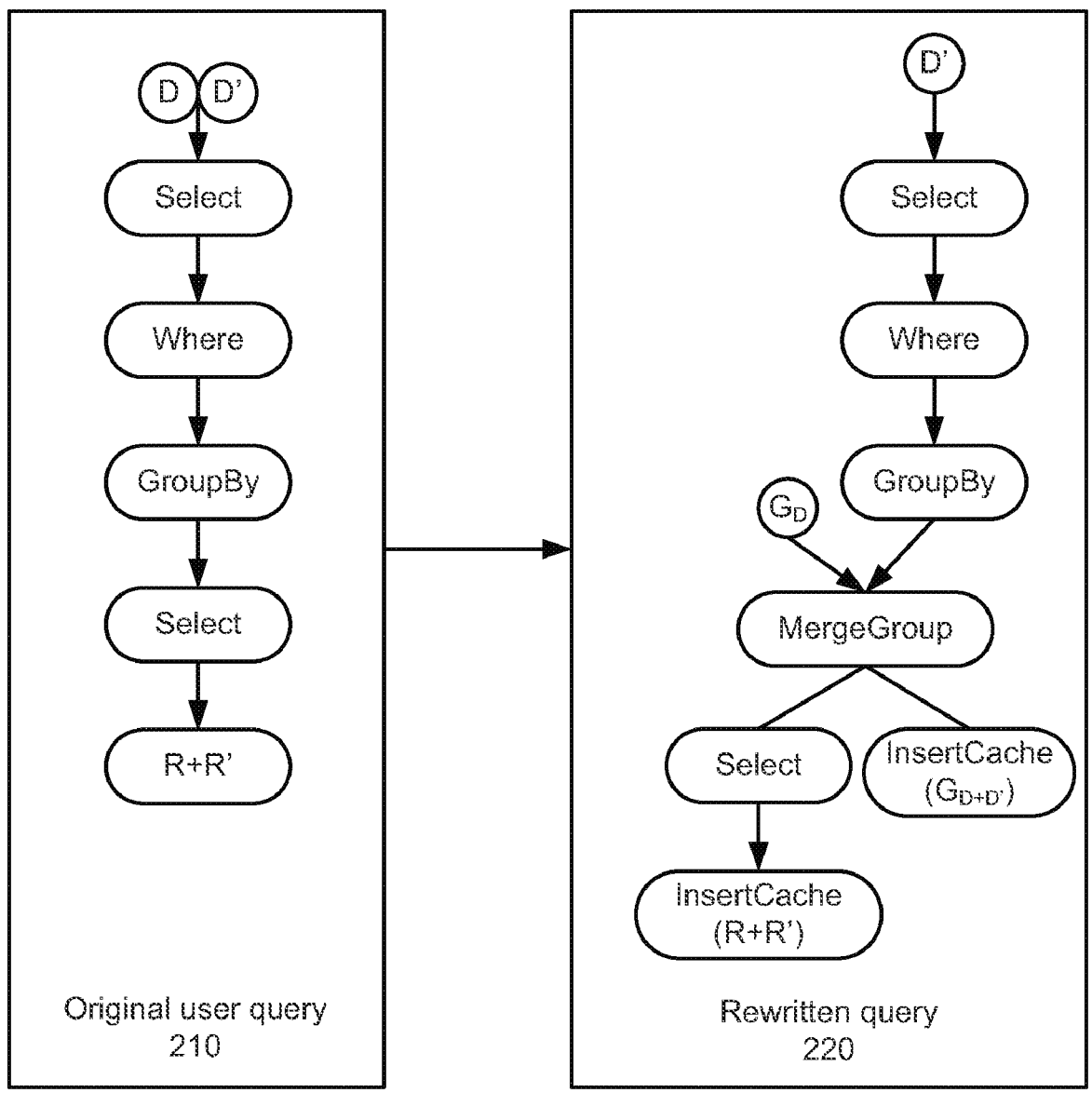
FIG. 2 is a diagram of an example of rewriting a query plan using cached results.

FIG. 2 is a diagram of an example of rewriting a query plan (from an original user query 210 to a rewritten query 220) using cached results. D is an old dataset and D' is an incremental dataset. The subquery D.Select.Where.GroupBy was computed before and its result is cached by the cache 185 as $G_D$. The query rewriter 120 may rewrite the query 210 into an equivalent one 220, reusing $G_D$. The MergeGroup operator (e.g., of DryadLINQ) may be used to combine $G_D$ with execution results from the incremental dataset D'. To support future incremental updates in the same manner, a cache entry of $G_{D+D'}$ is generated.

Figure 3:
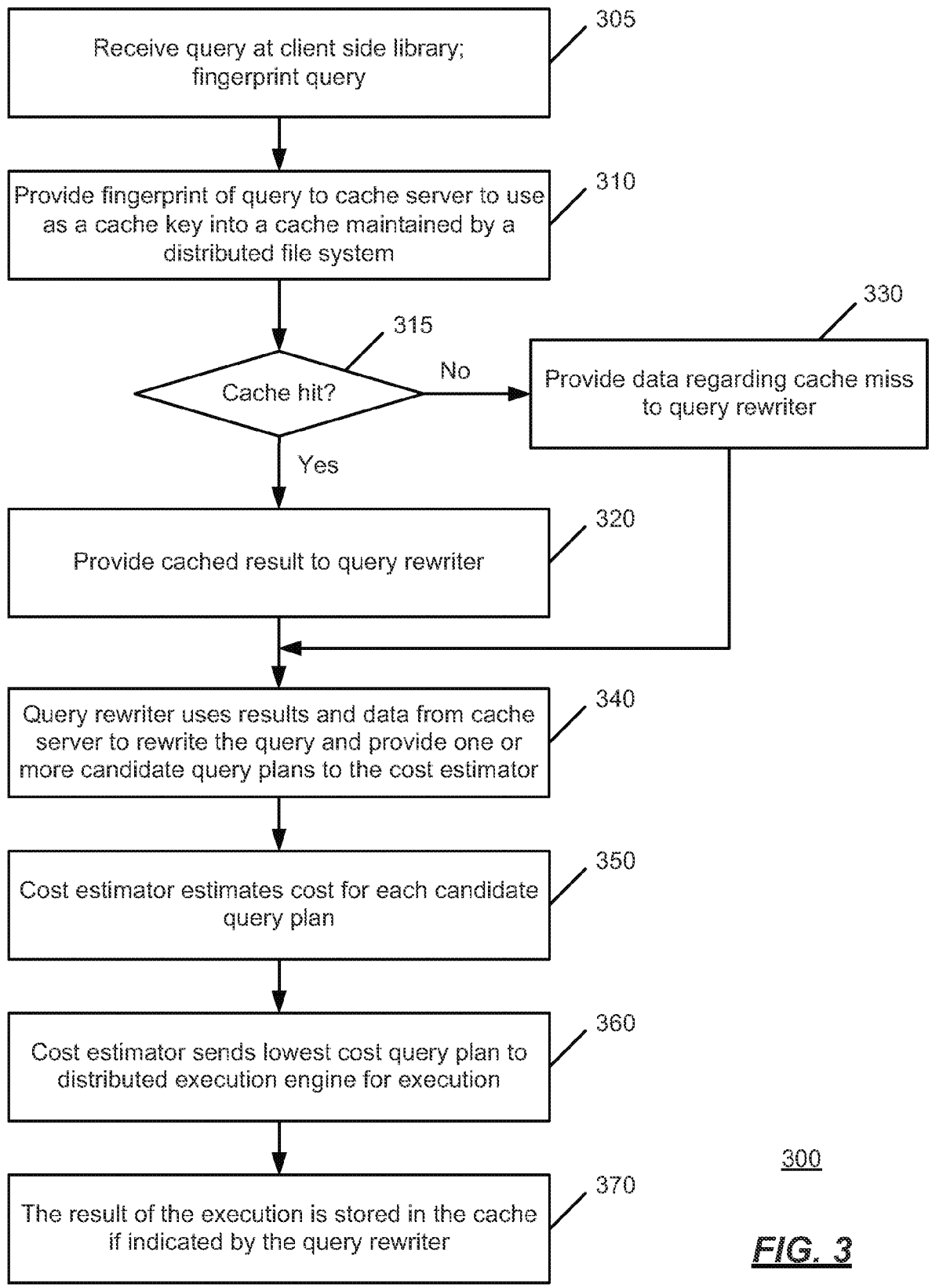
FIG. 3 is an operational flow of an implementation of a method of data and computation management.

FIG. 3 is an operational flow of an implementation of a method 300 of data and computation management. At 305, a query 105 may be received by the client side library 110 and may be fingerprinted by the fingerprinter 115. As noted above, the data center employs a persistent, store-wide cache server 150 that caches the results of previously computed queries and maps queries to their results. At 310, the fingerprint of the query 105 may be provided to the cache server 150 to use as a cache key into the cache 185 of the distributed file system 180.

At 315, it may be determined if a result corresponding to the fingerprint is found by the cache server 150 (i.e., it may be determined if a cache hit occurs). At 320, if a cache hit occurs, then the cache server 150 provides the cached result to the query rewriter 120. Otherwise, at 330, if a cache miss occurs (i.e., no cache hit occurred because a result corresponding to the fingerprint was not found in the cache 185), data regarding the cache miss may be provided to the query rewriter 120.

At 340, the query rewriter 120 uses the results and data to rewrite the query 105 and outputs one or more candidate query plans. For each candidate plan, the query rewriter 120 may determine and indicate whether a cache entry is to be generated upon successful execution of the query. For example, upon a cache miss, after the query is executed, a cache entry will be created if the execution succeeds.

At 350, the cost estimator 125 may receive the candidate query plans from the query rewriter and may estimate the cost for each candidate query plan. At 360, the cost estimator 125 may send the lowest cost query plan to the distributed execution engine 175 for execution. At 370, the result of the execution may be stored in the cache 185 (e.g., in a cache entry for the query) when its execution succeeds, if indicated by the query rewriter 120.

Figure 4:
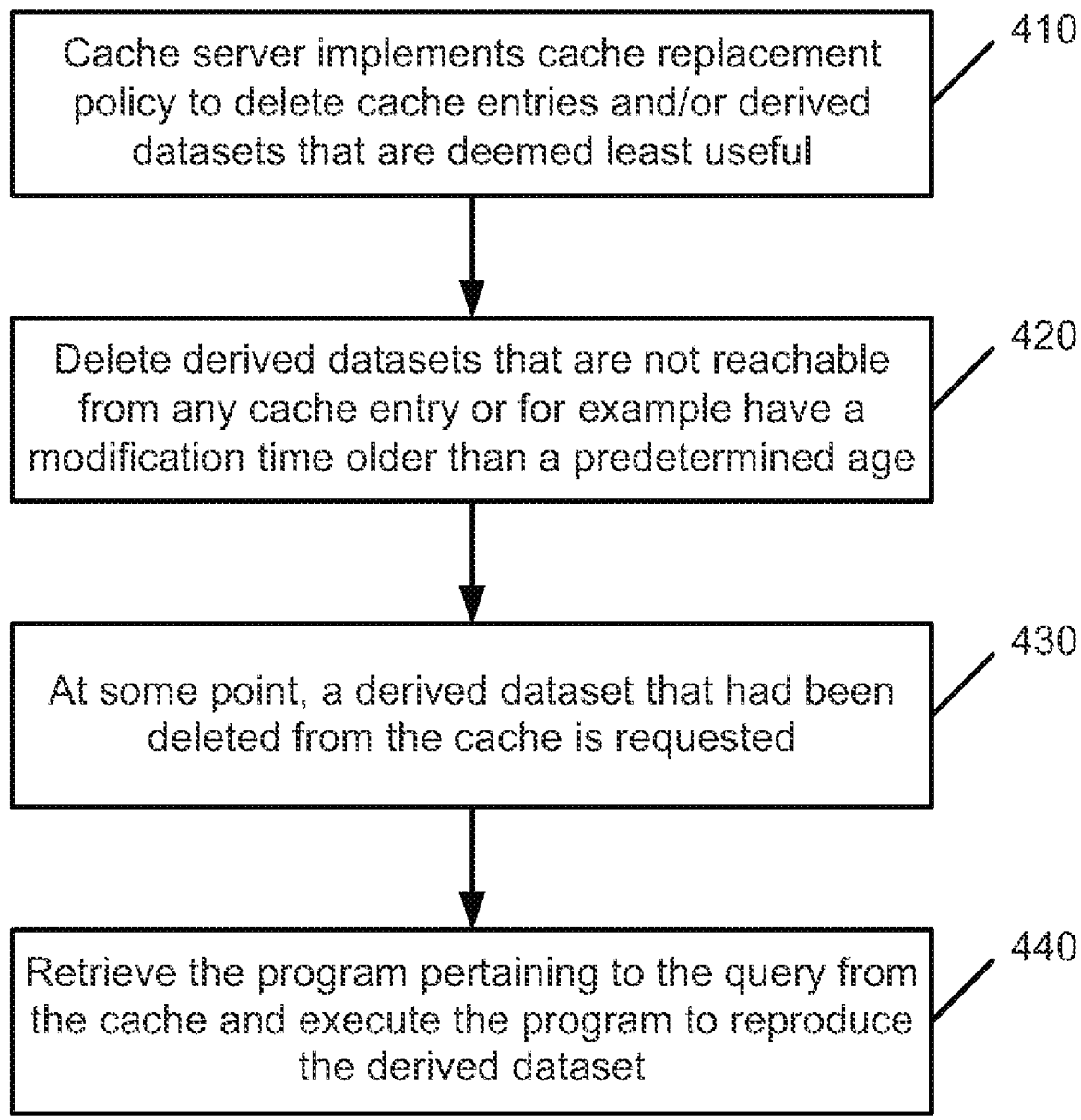
FIG. 4 is an operational flow of another implementation of a method of data and computation management.

FIG. 4 is an operational flow of another implementation of a method 400 of data and computation management. At 410, the cache server 150 implements a cache replacement policy to delete those cache entries (or their associated derived datasets 190) in the cache 185 that are deemed least useful. The data center employs a distributed garbage collector, such as the garbage collector 160, which manages the derived datasets. At 420, any derived datasets that are not reachable from any cache entry or; for example, have a modification time older than some predetermined age may be deleted. The cache server 150 and the garbage collector 160 may collectively implement the cache replacement policy.

At some point, at 430, a derived dataset is requested after its deletion. At 440, because the query that produces the derived dataset is contained in the request (e.g., in a query or subquery), the system may execute the query to reproduce the derived dataset as described above with respect to FIG. 1, for example. For example, the program pertaining to the query may be retrieved from the cache 185 and executed to reproduce the derived dataset. Thus, a request for a derived dataset may be satisfied, even in the presence of deletion.

Figure 5:
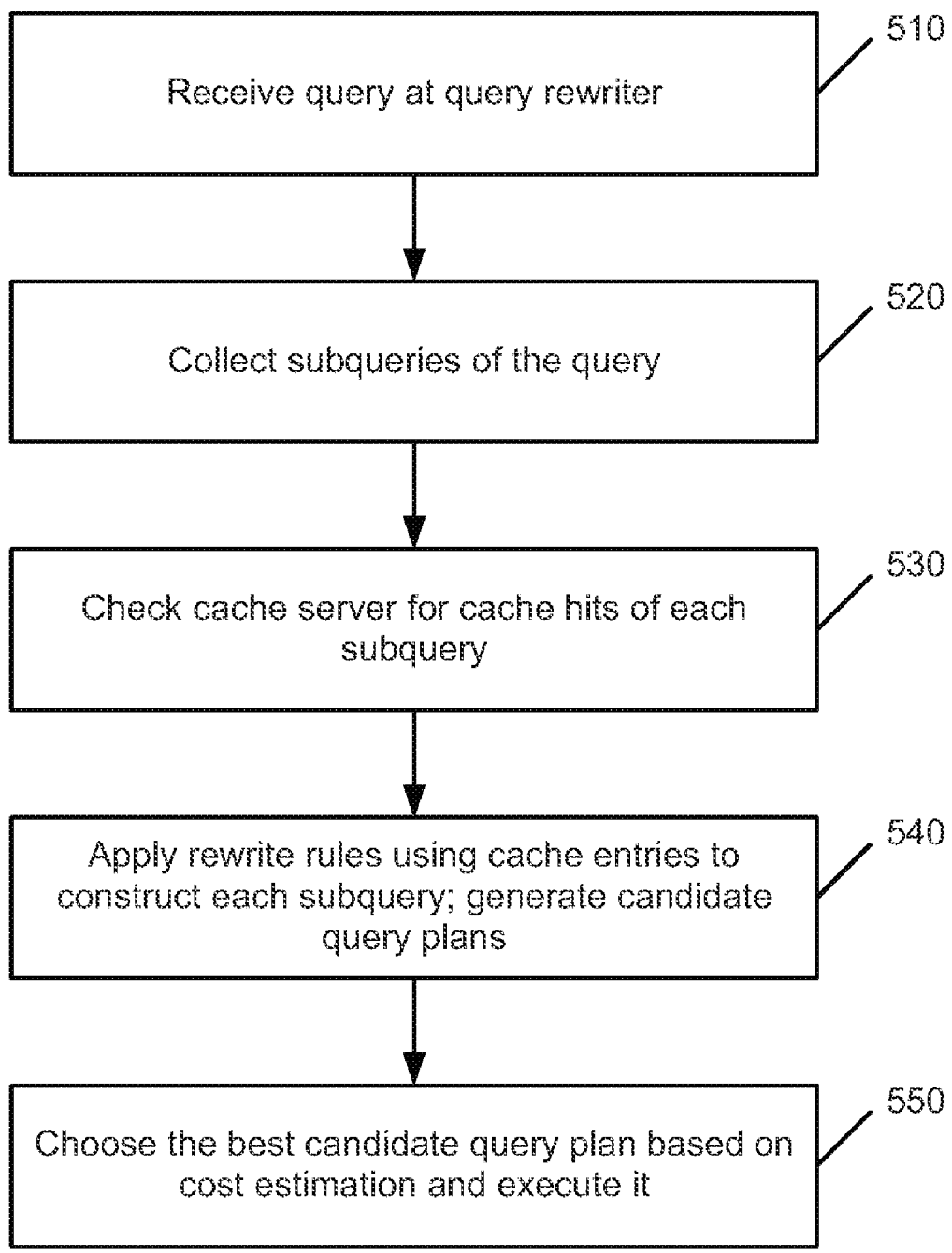
FIG. 5 is an operational flow of an implementation of a method of rewriting a query for data and computation management.

FIG. 5 is an operational flow of an implementation of a method 500 of rewriting a query for data and computation management. At 510, a query is received by a query rewriter 120. At 520, the subqueries of the query may be collected or otherwise determined, as described above with respect to FIG. 1, for example. At 530, the cache server 150 is checked for the cache hits of each subquery. At 540, rewrite rules may be applied using as many cache entries as possible to construct each subquery. The rewriter may generate candidate query plans using the rewrite rules. At 550, an execution plan (i.e., the best candidate query plan) may be selected by the cost estimator 125 and submitted to the distributed execution engine 175 for execution.

As an example of the rewriting process, with x representing a sequence of integers, the following query computes the square number of all odd numbers in the sequence:

q=x.Where(x=>x %2==1).Select(x=>x*x).

This query has two prefix subqueries:

$q_1$=x.Where(x=>x %2==1) and
$q_2$=x.Where(x=>x %2==1).Select(x=>x*x).

The query q is executed using a dataset D, i.e., q(D). As an example, the cache server returns two cache hits for $q_1$ (i.e., $r_1=q_1(d_1)$ and $r_2=q_1(d_2)$) and one cache hit for $q_2$ (i.e., $r_3=q_2(d_3)$). The $d_1$, $d_2$, and $d_3$ are subsets of D and, for example, $d_1$ and $d_2$ have no overlap. Rewrite rules may then be applied to the subqueries. The subqueries may be put back to the original query and used to generate a set of candidate query plans. In this example, there may be two candidate query plans:

1. $[r_1+r_2+(D-d_1-d_2).Where(x=>x \quad \%2==1)].Select(x=>x*x)$

2. $r_3+(D-d_3).Where(x=>x \%2==1).Select(x=>x*x)$

In the original query, DryadLINQ, for example, would pipeline Select and Where to execute together without writing the intermediate result to disk. However, the first candidate query plan breaks this pipelining in order to use the cached results. It would execute Where and Select separately. The Select operation would then use the cached results ($r_1$ and $r_2$) and the result of Where as input. Breaking pipelining could bring benefits in situations, for example, when Where does a large data reduction to the original dataset.

In an implementation, a cache entry is generated and inserted by the cache server 150 when a query execution succeeds. Caching the subquery results is used to share common subqueries across applications and perform incremental computation. To determine what to cache, the cache server 150 may keep a count for the prefix subqueries clients inquired in the past. When the count of a subquery passes a threshold θ, the subquery result is materialized and cached, as described with respect to FIG. 6.

Figure 6:
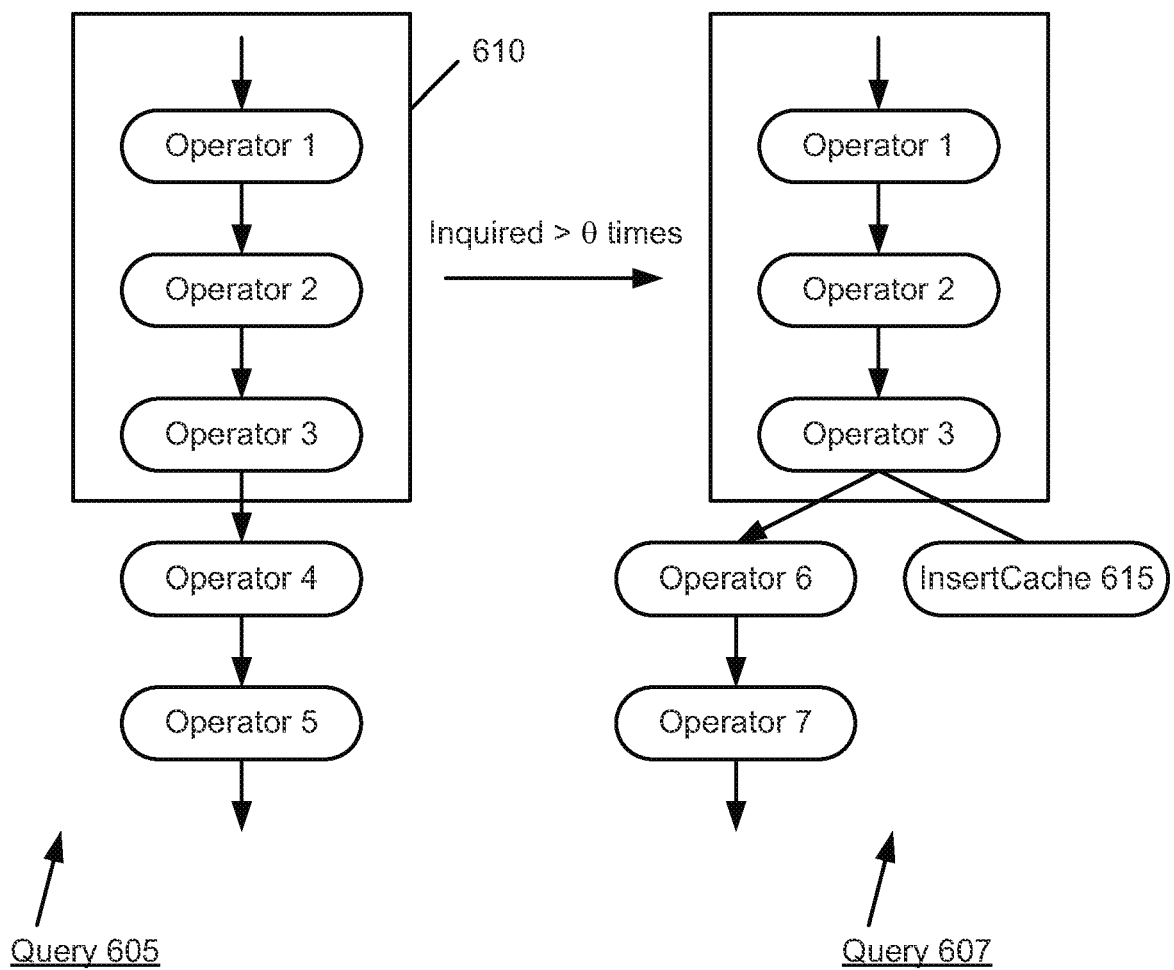
FIG. 6 is a diagram useful in describing an implementation of subquery caching.

FIG. 6 is a diagram useful in describing an implementation of subquery caching. The query on the left (query 605) is submitted by a user application and has five operators. Other queries in the same cluster (such as query 607) share the subquery of the first three operators (in the box 610). At some point, the cache server 150 may have received θinquiries about the subquery in the box 610. The query rewriter 120 of the next inquiry thus rewrites the query to store the subquery result in the box 610 and insert it to the cache 185 via the cache server 150, as shown on the right side of the FIG. 6 (the InsertCache operator 615). If the subquery turns out to provide little or no performance improvement, in an implementation, the subquery may not be cached.

When it is determined that the query q is a query executed on sliding windows, a query plan of q(D) may be generated:

$q(D)=C(q(d_1),q(d_2),\ldots,q(d_n))$.

Here $D=d_1+d_2+\ldots+d_n$. Its execution creates cache entries for $q(d_1), q(d_2), \ldots, q(d_n)$ with results $r_1, r_2, \ldots r_n$. So, if q is later determined on a new input $D_2=d_2+\ldots+d_n+d_{n+1}$, the query plan is:

$q(D_2)=C(q(d_2),\ldots,q(d_n),q(d_{n+1}))$

[By Cache Hits]

$=C(r_2,\ldots,r_n,q(d_{n+1}))$.

A new cache entry may be generated for the result of $q(d_{n+1})$ to achieve the incremental execution of q on sliding windows in the future.

In an implementation, caching is performed as long as the available disk space is not under a predetermined threshold and the caching saves cumulative machine time. When the available disk space in the data center is under the threshold, the cache server 150 may start to delete cache entries (and/or associated derived datasets) that it determines to have the least value in the future. The datasets protected by those deleted cache entries will be considered garbage and collected by the garbage collector 160.

In an implementation, the cache server 150 maintains a history about queries executed in the data center. The cache server 150 may estimate the execution frequency of queries in the future using historical data, and may use this information to determine which cache entries to delete. Although some derived datasets may be deleted, if those cache entries are requested in the future, the derived datasets may be obtained again by running the programs that produced them because the programs are maintained by the cache server 150, as described above with respect to FIG. 1, for example.

In an implementation, cache entries or associated derived datasets may be deleted using a cost-to-benefit ratio. Suppose s is the size of the data protected by a cache entry. If the cache entry is used by k queries, and each query is expected to reuse this cache entry with frequency $f_i$ and save a cumulative machine time of $\Delta t_i$, the cost benefit ratio is defined as $$\frac{s}{\sum_{i=1}^{k}\frac{\Delta t_i}{f_i}}.$$

The cache server may delete the cache entry and/or derived dataset with the largest cost benefit ratio. In an implementation, an optimal page replacement technique may be used.

Figure 7:
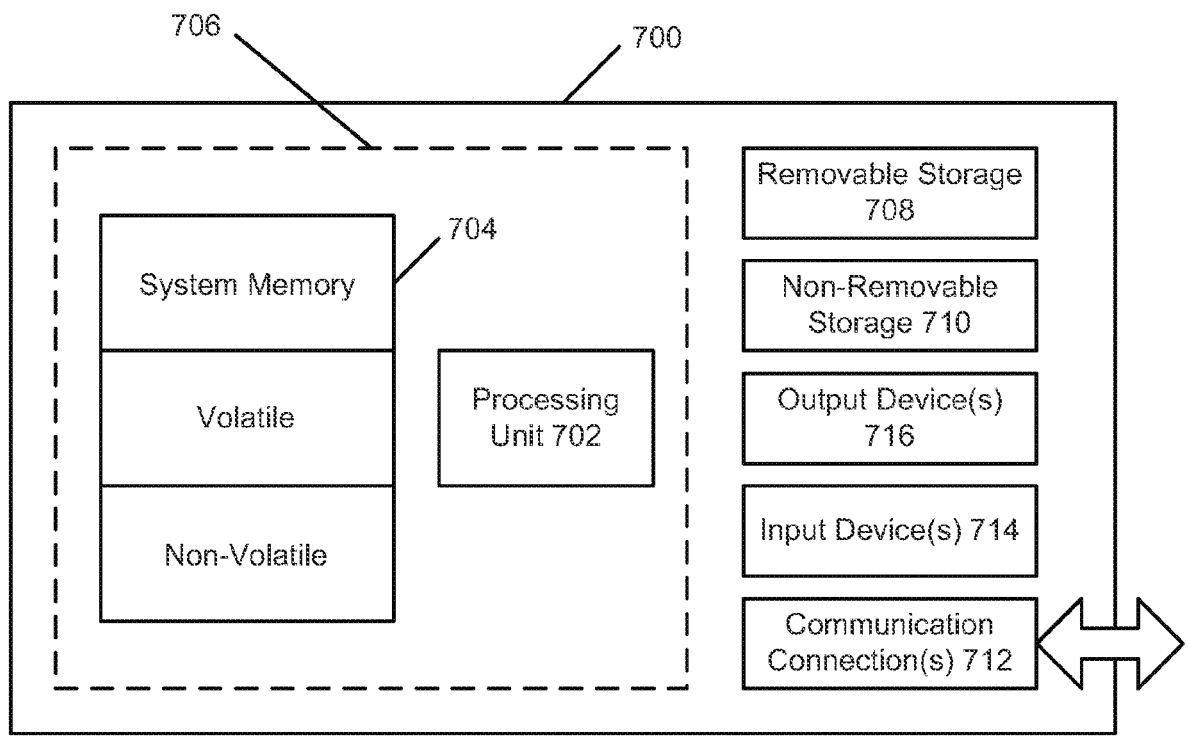
FIG. 7 is a block diagram of an example computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. Computing device 700 depicts the components of a basic computer system providing the execution platform for certain software-based functionality in accordance with various embodiments. Computing device 700 can be an environment upon which a client side library, cluster wide service, and/or distributed execution engine (or their components) from various embodiments is instantiated. Computing device 700 can include, for example, a desktop computer system, laptop computer system or server computer system. Similarly, computing device 700 can be implemented as a handheld device (e.g., cellphone, etc.) Computing device 700 typically includes at least some form of computer readable media. Computer readable media can be a number of different types of available media that can be accessed by computing device 700 and can include, but is not limited to, computer storage media.

In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A data and computation management method implemented on at least one machine having at least one processor, comprising:
   receiving a query at a client side library implemented at a client side;
   providing a cache key based on the query from the client side library to a cache server of a cluster wide service implemented at a server side separated from the client side by a network;
   retrieving a result from the cache server using the cache key;
   providing the result retrieved from the cache server to a query rewriter of the client side library at the client side;
   rewriting the query into an equivalent query, by the query rewriter, using the result retrieved from the cache server of the server side;
   providing the equivalent query from the query rewriter to a distributed execution engine for execution;
   determining a cost benefit ratio for each of a plurality of cache entries in a cache; and
   deleting, from the cache, the cache entry having the largest cost benefit ratio.

2. The method of claim 1, further comprising generating a fingerprint of the query at the client side library, wherein the cache key comprises the fingerprint.

3. The method of claim 1, further comprising determining whether the cache key provides a cache hit into a cache via the cache server, and if so, then the result is based on the cache hit, and otherwise the result is based on data regarding a cache miss.

4. The method of claim 1, further comprising:
   generating a plurality of query plans pursuant to rewriting the query into the equivalent query using the result retrieved from the cache server;
   determining a cost of each of the query plans using a cost estimator;
   determining which of the query plans has a lowest cost; and
   providing the query plan having the lowest cost from the query rewriter to a distributed execution engine for execution.

5. The method of claim 1, further comprising caching a result of the execution of the equivalent query in a cache via the cache server upon successful execution of the equivalent query.

6. The method of claim 1, wherein the result retrieved from the cache server comprises a derived dataset that is identified in a cache of the cache server with a query that computed the result.

7. The method of claim 6, further comprising determining whether the derived dataset is unreachable from any cache entry or has a modification time older than a predetermined age, and if so, then deleting the derived dataset from the cache.

8. The method of claim 7, further comprising, after deleting the derived dataset from the cache, receiving a request for the derived dataset, retrieving a program pertaining to the query that computed the result from the cache server, and executing the program to reproduce the derived dataset.

9. A data and computation management method implemented on at least one machine having at least one processor, comprising:
   receiving a query at a client side library implemented at a client side;
   determining, by a query rewriter of the client side library at the client side, a plurality of subqueries of the query;
   retrieving, from a cache by a cache server of a cluster wide service implemented at a server side separated from the client side by a network, a plurality of cache entries for the subqueries of the query;
   generating a plurality of query plans, by the query rewriter, using the retrieved cache entries for the subqueries of the query;
   choosing one of the query plans as the execution plan using a cost estimator, and providing the execution plan to a distributed execution engine for execution;
   determining, by the cache server, a cost benefit ratio for each of the plurality of cache entries in the cache; and
   deleting from the cache, by the cache server, the cache entry having the largest cost benefit ratio.

10. The method of claim 9, wherein each of the cache entries for the subqueries of the query is a cache entry for a prefix subquery.

11. The method of claim 9, further comprising:
receiving an additional query at the client side library;
determining a plurality of subqueries of the additional query, the plurality of subqueries of the additional query being the same as the plurality of subqueries of the query; and
rewriting the additional query into an equivalent query using the retrieved cache entries for the subqueries of the query.

12. The method of claim 11, further comprising determining an incremental query plan for the additional query using a combining operator.

13. The method of claim 9, further comprising:
determining a result for each of the subqueries based on the execution plan; and
updating the cache entries for the subqueries of the query with the result for each of the subqueries based on the execution plan.

14. The method of claim 9, further comprising creating a new cache entry in the cache based on the execution of the execution plan.

15. A data and computation management system, comprising:
at least one memory coupled to at least one processor;
a client side library, implemented at a client side, that receives a query;
a cluster wide service, implemented at a server side separated from the client side by a network, that receives information pertaining to the query from the client side library and retrieves at least one derived dataset from a cache server based on the information pertaining to the query;
a query rewriter comprised within the client side library at the client side that receives the at least one derived dataset from the cluster wide service of the server side and rewrites the query into an equivalent query using the at least one derived dataset; and
a distributed execution engine that receives the equivalent query from the query rewriter and executes the equivalent query;
wherein the cluster wide service comprises a garbage collector that determines a cost benefit ratio for each of a plurality of cache entries in a cache and deletes, from the cache, the cache entry having the largest cost benefit ratio.

16. The system of claim 15, further comprising the cache that comprises a cache entry for the query, the cache entry comprising a location of the derived dataset for the query, past execution statistics of the query, and a process to reproduce the derived dataset.

17. The system of claim 16, wherein the client side library comprises a fingerprinter that generates a fingerprint for the query and provides the fingerprint to the cluster wide service, wherein the cluster wide service comprises the cache server that uses the fingerprint as a cache key into the cache.

18. The system of claim 17, wherein the query rewriter generates a plurality of query plans pursuant to rewriting the query into the equivalent query, wherein the client side library comprises a cost estimator that determines a cost of each of the query plans, wherein the query writer determines which of the query plans has a lowest cost and provides the query plan having the lowest cost to the distributed execution engine for execution.

\* \* \* \* \*